(12) United States Patent
Takahashi

(10) Patent No.: US 6,834,031 B2
(45) Date of Patent: Dec. 21, 2004

(54) METHOD OF SAMPLING WOBBLE COMPONENTS AND DISK DRIVE UNIT EXECUTING THE METHOD

(75) Inventor: Kazuto Takahashi, Nagano (JP)

(73) Assignee: Shinano Kenshi Kabushiki Kaisha, Nagano (JP)

(*) Notice: Subject to any disclaimer, the term of this patent is extended or adjusted under 35 U.S.C. 154(b) by 31 days.

(21) Appl. No.: 10/117,238

(22) Filed: Apr. 8, 2002

(65) Prior Publication Data

US 2002/0159380 A1 Oct. 31, 2002

(30) Foreign Application Priority Data

Apr. 27, 2001 (JP) ........................................ 2001-131025

(51) Int. Cl.$^7$ ................................................. G11B 7/00
(52) U.S. Cl. ................ 369/47.1; 369/47.17; 369/44.32; 369/44.13
(58) Field of Search ........................... 369/275.3, 44.13, 369/44.32, 124.05, 47.17, 47.1, 47.27, 44.42, 44.34

(56) References Cited

FOREIGN PATENT DOCUMENTS

| JP | 06-290462 A | 10/1994 | |
|---|---|---|---|
| JP | 08-235592 A | 9/1996 | |
| JP | 08-321045 A | 12/1996 | |
| JP | 09-326199 A | 12/1997 | |
| JP | 10-11757 A | 1/1998 | |
| JP | 10-143921 A | 5/1998 | |
| JP | 10-149543 A | 6/1998 | |
| JP | 2000-331347 | 11/2000 | |
| JP | 2001-93 147 | * 4/2001 | ............. 369/44.13 |

* cited by examiner

Primary Examiner—Nabil Hindi
(74) Attorney, Agent, or Firm—Birch, Stewart, Kolasch & Birch, LLP

(57) ABSTRACT

The method of sampling wobble components of the present invention is capable of realizing a disk drive unit, which can write data at high speed, and reducing manufacturing cost of the disk drive unit. The wobble components are sampled from laser beams reflected from an optical disk so as to write data on the optical disk. The laser beams are low power laser beams for reading data and high power laser beams for writing data. The method is characterized in that the wobble components of the reflected low power laser beams and the reflected high power laser beams are continuously sampled.

1 Claim, 4 Drawing Sheets

METHOD OF SAMPLING WOBBLE COMPONENTS AND DISK DRIVE UNIT EXECUTING THE METHOD

BACKGROUND OF THE INVENTION

The present invention relates to a method of sampling wobble components without using a sample/hold circuit and a disk drive unit executing said method.

Time data and position data of optical disks, e.g., CD-R/RW, DVD-R/RW, are recorded by a wobble groove of a pregroove of the disk. Position data of the wobble groove is known by measuring luminous power of reflected laser beams, which are emitted from laser diodes and reflected at the optical disk. Luminous power of laser beams for reading data from the optical disk is different from that for writing data thereon, therefore luminous power of the reflected laser beams for reading data are also different from that for writing data. Identification data, which identify the laser beams for reading or writing data, and data of the wobble components are included in the reflected laser beams. To sample the wobble components from low power laser beams for reading data and high power laser beams for writing data, flexures caused by difference of the luminous power between the reflected low power laser beams and the reflected high power laser beams must be shaped when the wobble components are sampled. However, a complex mechanism must be required to shape the flexures, so that the conventional disk drive unit must have a complex structure.

To omit the step of shaping the flexures of the wobble components which are caused by the difference of the luminous power of the reflected laser beams, the wobble components are sampled from the low power laser beams only, so that the structure of the disk drive unit can be simple. When data are written by the high power laser beams, the wobble components of the low power laser beams are used. In this drive unit, the wobble components are treated by a sample/hold circuit.

In the case of treating the wobble components by the sample/hold circuit, the wobble components are sampled from the low power reflected laser beams for reading data from the disk. Electric signals indicating the wobble components charge a capacitor. On the other hand, when data are written on the disk by the high power laser beams, the capacitor discharge the electric signals so as to hold the wobble components of the low power laser beams for reading data. Therefore, the wobble components can be known while writing data.

In the sample/hold circuit, the wobble components are treated by charging and discharging the capacitor. However, it takes a long time to write data on the disk due to charging time, etc. So it is difficult to realize a disk drive unit capable of writing data in a short time.

Another conventional drive unit has a dividing circuit for sampling the wobble components instead of the sample/hold circuit. However, the dividing circuit cannot be actuated by one electric source, its frequency characteristics are not good, and it is expensive. Therefore, the disk drive unit including the dividing circuit is not useful.

SUMMARY OF THE INVENTION

An object of the present invention is to provide a method of sampling wobble components which is capable of realizing a disk drive unit, which can write data at high speed, and reducing manufacturing cost of the disk drive unit.

Another object is to provide a disk drive unit executing said method.

To achieve the objects, the present invention has following structures.

In the method of the present invention, wobble components are sampled from laser beams reflected from an optical disk so as to write data on the optical disk, and the laser beams are low power laser beams for reading data and high power laser beams for writing data,.

The method of the present invention is characterized in that the wobble components of the reflected low power laser beams and the reflected high power laser beams are continuously sampled.

In the method, one longitudinal edge of a wobble groove of the optical disk may be detected by a first photo diode for detecting first reflected laser beams, and the other longitudinal edge thereof may be detected by a second photo diode for detecting second reflected laser beams, wherein the first and second reflected laser beams may be processed so as to sample the wobble components.

By the method of the present invention, various kinds of noise included in signals of the sampled wobble components can be removed.

The disk drive unit, in which wobble components are sampled from laser beams reflected from an optical disk so as to write data on the optical disk, is characterized in, that the laser beams are low power laser beamed for reading data and high power laser beamed for writing data, and that the wobble components of the reflected low power laser beams and the reflected high power laser beams are continuously sampled.

By employing this structure, the wobble components can be sampled without using a sample/hold circuit, so that high speed operation of the disk drive unit can be realized.

Further, the disk drive unit, in which wobble components are sampled from laser beams reflected from an optical disk so as to write data on the optical disk, comprises:

a first photo diode for detecting one longitudinal edge of a wobble groove of the optical disk;

a second photo diode for detecting the other longitudinal edge of the wobble groove;

a differential amplifier to which signals are sent from the first and second photo diodes receiving the reflected laser beams, the differential amplifier shaping a flexure caused by difference of luminous power between low power laser beams of the reflected laser beams, which are used for reading data, and high power laser beams thereof, which are used for writing data, and sampling the wobble components only;

a noise removing circuit removing noise from the wobble components sampled by the differential amplifier; and a comparator digitizing the wobble components from which the noise has been removed by the noise removing circuit.

With this structure, flexures and noise included in signals of the sampled wobble components can be removed, and high speed operation can be realized due to no sample/hold circuit.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Firstly, wobble components 1 will be explained.

As described in BACKGROUND OF THE INVENTION, the wobble components 1 are signal components included in the reflected beams, which are reflected from the wobble groove when data are written on an optical disk, e.g., CD-R.

The wobble groove 16 (see FIG. 3) is physically formed and meandered in a recording face of the optical disk. Pits will be formed in the wobble groove 16. When laser beams emitted from a photo diode are reflected on the optical disk, various components of the wobble groove 16 are included in the reflected beams.

To know time data, etc. of the optical data, the wobble components 1 are sampled from the reflected beams.

Figure 1:
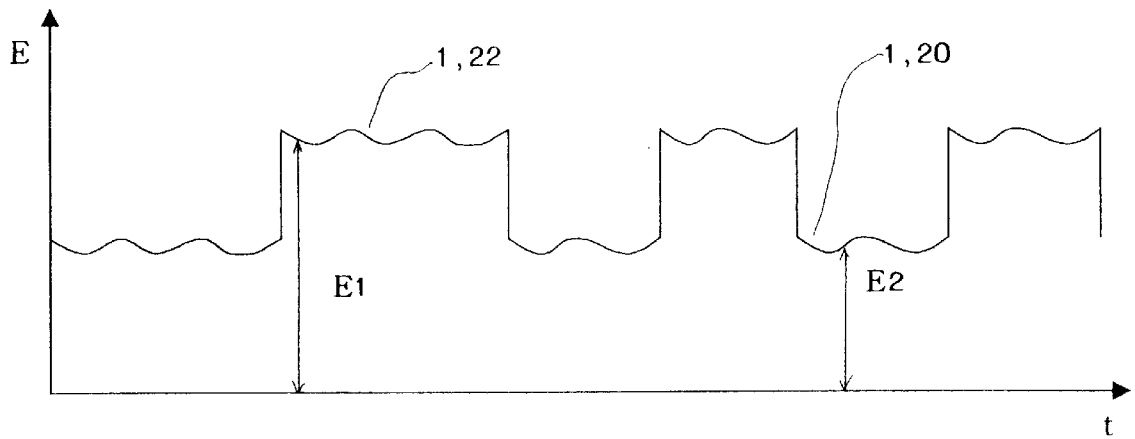
FIG. 1 is a waveform chart showing output level of reflected beams, from which wobble components are sampled.

FIG. 1 is a waveform chart showing output level of the reflected beams from which the wobble components 1 are sampled. An embodiment of the method of sampling the wobble components will be explained with reference to FIG. 1. In FIG. 1, the axis of ordinates indicates luminous level of the reflected beams; the axis of abscissas indicates time.

Output level of high power laser beams 22 for writing data is E1, and the laser beams 22 are capable of forming pits in the wobble groove 16. On the other hand, output level of low power laser beams 20 for reading data is E2, and the laser beams 20 reflected from the pits can be detected.

The high power laser beams 22 whose output level are E1 and the low power laser beams 20 whose output level are E2 are frequently emitted to the optical disk. Therefore, the reflected beams are low power reflected beams and high power reflected beams, which are observed as pulse-shaped waves shown in FIG. 1.

Both of the low power reflected beams, which are reflected beams of the low power laser beams 20, and the high power reflected beams, which are reflected beams of the high power laser beams 22, include the wobble components 1.

Conventionally, the wobble components 1 are sampled from the low power laser beams 20 only. In the present embodiment, the wobble components 1 are sampled from both of the low power laser beams 20 for reading data and the high power laser beams 22 for writing data.

By sampling the wobble components 1 from the both laser beams 20 and 22, the wobble components 1 can be continuously sampled without breaks in spite of no sample/hold circuit.

Figure 2:
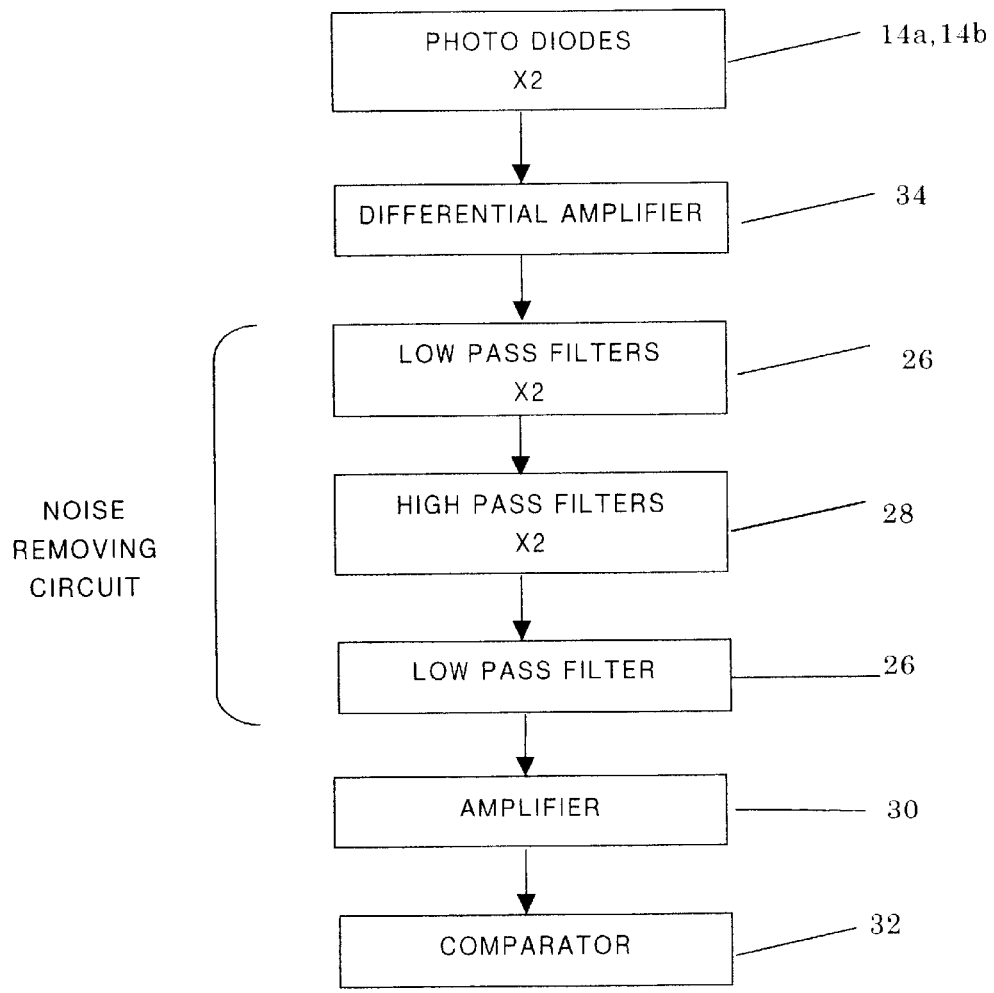
FIG. 2 is a block diagram of a wobble component sampling circuit.

Next, a sampling circuit for sampling the wobble components 1 from the reflected beams of the laser beams 20 and 22 will be explained with reference to FIG. 2. A block diagram of the sampling circuit is shown in FIG. 2.

In the present embodiment, a couple of photo diodes 14a and 14b are provided. Two signals corresponding to luminous power of the reflected beams, which have been respectively received and sent by the photo diodes 14a and 14b, are inputted to a differential amplifier 34. The differential amplifier 34 detects the difference between the two signals and amplifies the difference. Noise included in the wobble signals, which have been amplified by the differential amplifier 34, are removed by a noise removing circuit, which includes filters 26 and 28. An amplifier 30 amplifies the wobble signals, from which the noise has been removed. A comparator 32 digitizes the amplified wobble signals.

Note that, in the present embodiment, the noise removing circuit includes a plurality of filters 26 and 28. But the structure of the noise removing circuit is not limited to the present embodiment.

Function of sampling the wobble components 1 will be explained.

Figure 3:
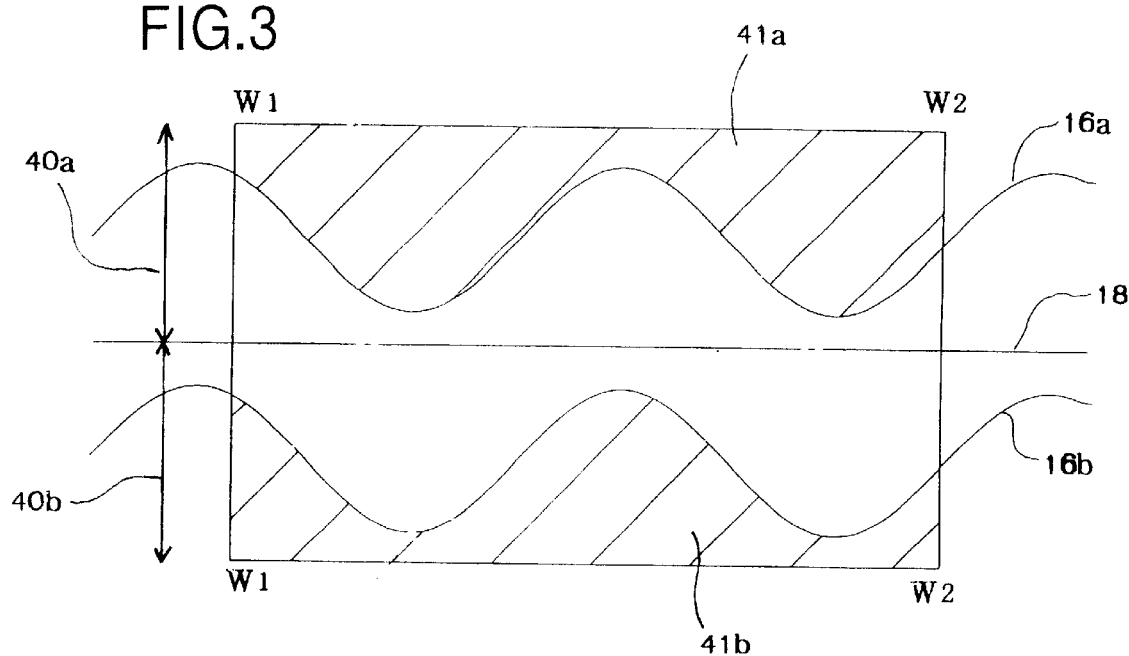
FIG. 3 is a partial plan view of an optical disk including a wobble groove.

To sample the wobble components, a laser diode emits laser beams toward the optical disk, and the photo diodes 14a and 14b receive the reflected laser beams and measure the luminous power thereof. FIG. 3 shows a partial plan view of the optical disk including the wobble groove 16.

In FIG. 3, the photo diode 40a measures luminous power of the laser beams reflected in a section 40a, which is on the upper side of a center line 18; the photo diode 40b measures luminous power of the laser beams reflected in a section 40b, which is on the lower side of the center line 18. Signals outputted by the photo diodes 40a and 40b respectively indicate luminous power of the laser beams reflected in the sections 40a and 40b. In the section 40a, the laser beams are reflected in a slashed area 41a, which is located on the upper side of one longitudinal edge 16a of the wobble groove 16 and between measuring ends W1 and W2; in the section 40b, the laser beams are reflected in a slashed area 41b, which is located on the lower side of the other longitudinal edge 16b of the wobble groove 16 and between the measuring ends W1 and W2. Since the wobble groove 16 is meandered, the luminous power of the reflected laser beams vary with changing a measuring position along the center line 18. Variation of the luminous power of the reflected laser beams, which is caused by changing the measuring positions, in each slashed area 41a and 41b indicates the wobble components.

However, the photo diodes 14a and 14b receive the reflected laser beams including other components, so the output signals of the photo diodes 14a and 14b include not only the wobble components but also other components.

Figure 4A:
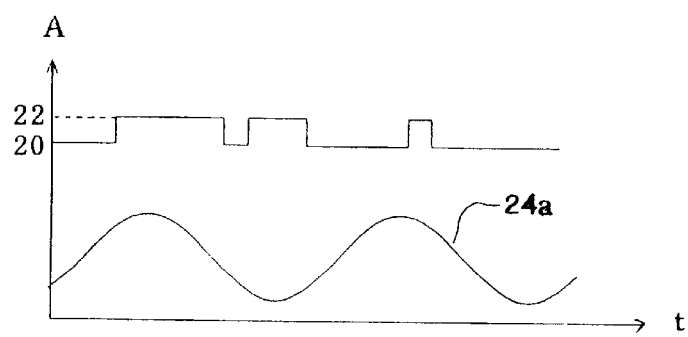
FIG. 4A is a waveform chart of wobble components in an area 41a and luminous power of laser beams.
Figure 4B:
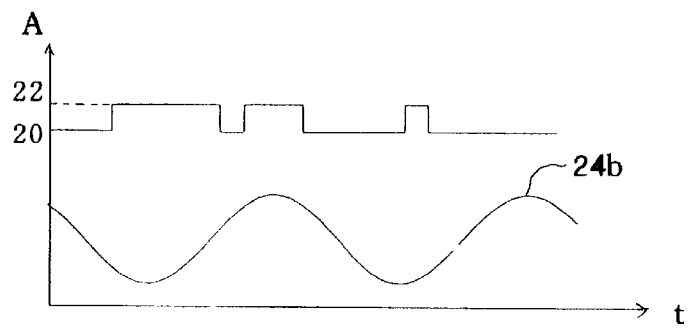
FIG. 4B is a waveform chart of wobble components in an area 41b and luminous power of laser beams.

FIGS. 4A and 4B show waveforms 24a and 24b of the wobble components and variation of the luminous power of the laser beams measured between the measuring ends W1 and W2. FIG. 4A shows the waveform 24a of the wobble components measured in the slashed area 41a and the luminous power of the laser beams; FIG. 4B shows the waveform 24b of the wobble components measured in the slashed area 41b and the luminous power of the laser beams.

As shown in FIGS. 4A and 4B, amplitude of the waveforms 24a and 24b are equal; phases of the both are mutually inverted. On the other hand, variation of amplitude and phases of the laser beams are equal in FIGS. 4A and 4B.

The output signals of the photo diodes 14a and 14b are inputted to the differential amplifier 34. The differential amplifier 34 inverts the waveform 24a (or 24b) with respect to the other waveform 24b (or 24a) and differential-amplifies so as to correspond the phase of the waveform 24a with the waveform 24b. By corresponding the waveform 24a with the waveform 24b, disuse components can be removed, and the wobble components 1 can be sampled. The wobble components 1, which is sampled by differential-amplifying the signals, is shown in FIG. 5.

Figure 5:
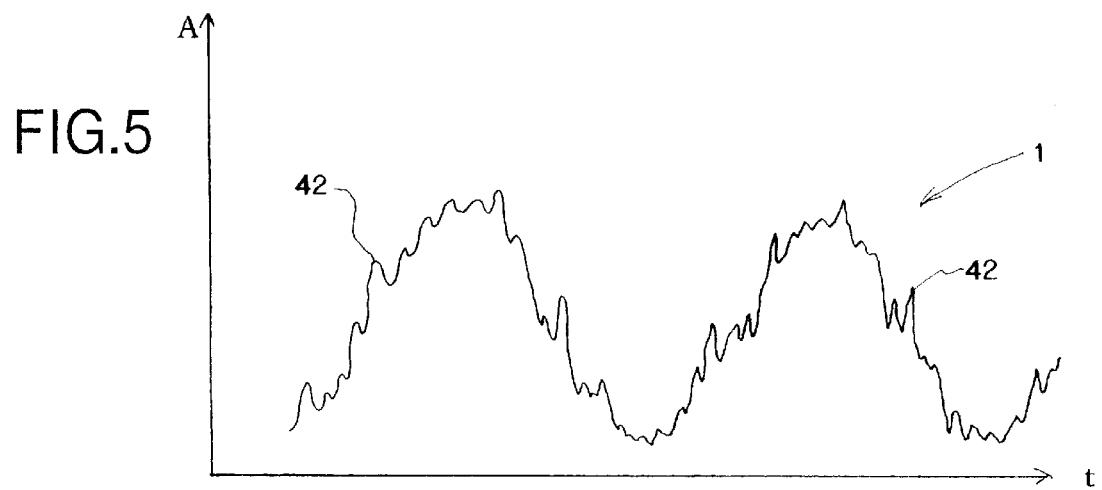
FIG. 5 is a waveform chart of the wobble components differential-amplified.

In FIG. 5, the wobble components 1 include the flexures 42, which are caused by difference of the luminous power between the high power laser beams and the lower power laser beams. Since the photo diodes 14a and 14b simultaneously measure the luminous power of the laser beams, the variation of the luminous power of the laser beams measured by the photo diodes 14a and 14b are equal as shown in FIGS. 4A and 4B. Namely, the difference of the luminous power of the laser beams measured by the photo diodes 14a and 14b will be made zero by differential-amplifying the signals from the photo diodes 14a and 14b. Actually, however, the difference cannot be made zero because of variation of the luminous power of the reflected laser beams. Therefore, as shown in FIG. 5, the flexures 42, which are caused by difference of the luminous power, are left in the wobble components 1.

Since the form of the meandered wobble groove 16 is frequency-modulated, small differences between amplitudes can be ignored when the wobble components 1 are analyzed. Namely, only the frequency of the waveform of the wobble components 1 shown in FIG. 5, which has been differential-amplified, is processed. By filtering the waveform of the wobble components 1 shown in FIG. 5, the flexures 42 included in the wobble components 1 can be shaped. The process of filtering the wobble components will be explained.

Figure 6:
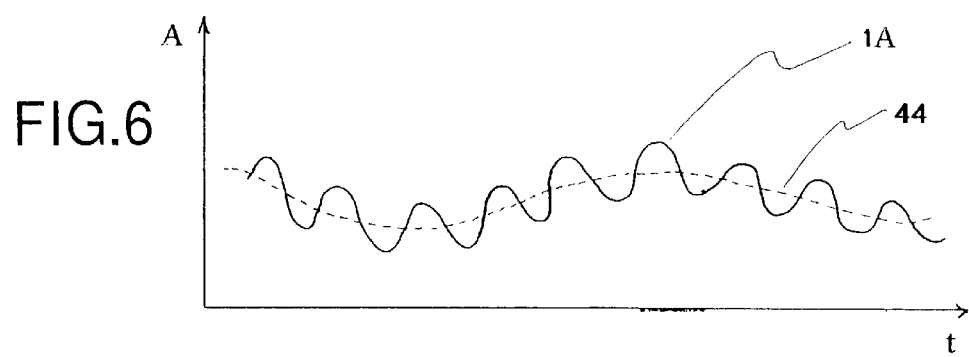
FIG. 6 is a waveform chart of the wobble components filtered by a low pass filter.

By passing the waveform of the wobble components 1 shown in FIG. 5 through the low pass filter 26, the flexures 42 are shaped and the waveform of the wobble components 1 is formed into a waveform 1A (see FIG. 6). Note that, time span of the waveform 1A shown in FIG. 6 is longer than that shown in FIGS. 5 and 7–9.

As clearly shown in FIG. 6, the waveform 1A, which has been filtered by the low pass filter 26, still includes flexures 44, which are caused by focusing data, tracking data, etc.

Figure 7:
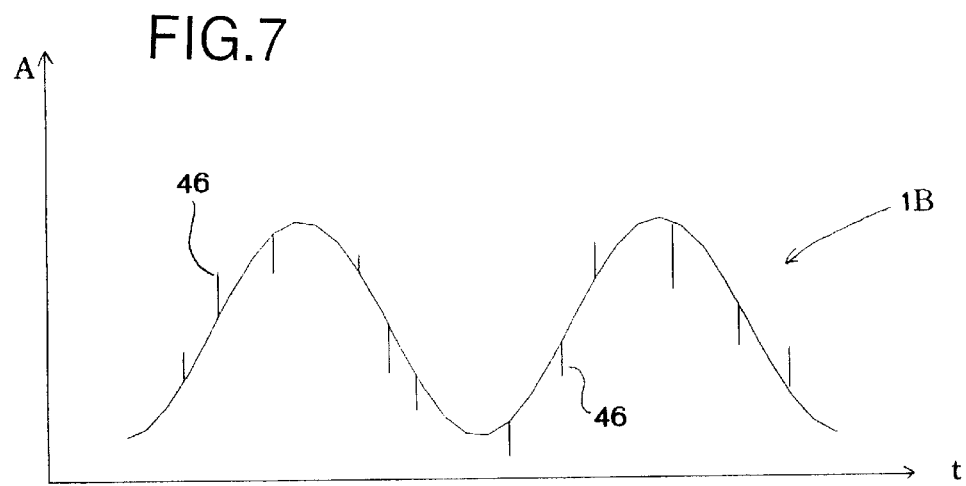
FIG. 7 is a waveform chart of the wobble components filtered by a high pass filter.
Figure 8:
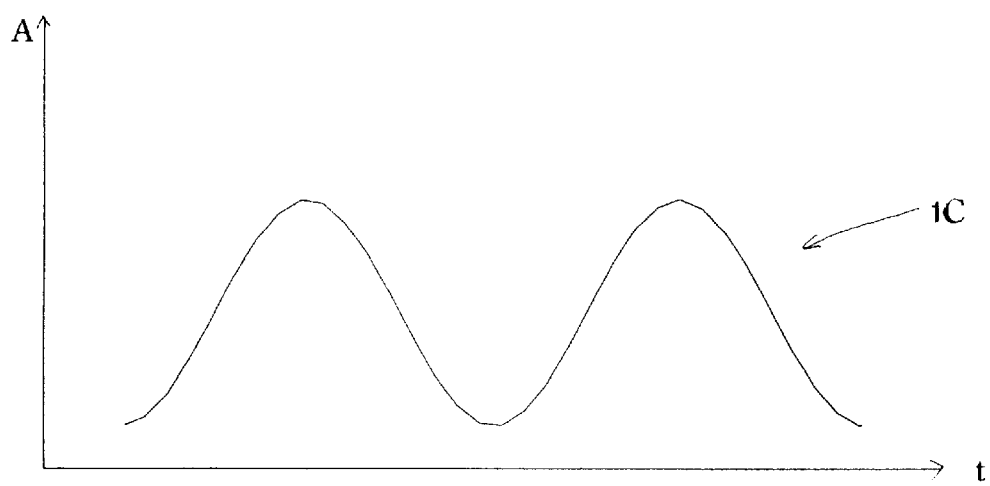
FIG. 8 is a waveform chart of the wobble components from which noise has been removed.

To shape the flexures 44, the waveform 1A shown in FIG. 6 is filtered by a high pass filter 28. The waveform 1B of the wobble components, which has been shaped by the high pass filter 28, is shown in FIG. 7. When the waveform 1A is filtered by the high pass filter 28, noise 46 are included in the waveform 1B due to characteristics of the high pass filter 28. To remove the noise 46, the waveform 1B is filtered by another low pass filter 26. By passing through another low pass filter 26, the waveform 1B can be formed into a waveform 1C shown in FIG. 8, from which the noise 46 have been removed. The above described filtering processes remove the flexures and the noise, so that the waveform 1C of the pure wobble components can be produced.

The waveform 1C of the pure wobble components is amplified by the amplifier 30, and the amplified waveform 1C is inputted to the comparator 32. The comparator 32 converts the analogue waveform 1C into a pulse-shaped waveform 1D of the wobble components (see FIG. 9). Minimum level of the pulse-shaped waveform 1D is regarded as zero level, so that the waveform 1D can be recognized as a digital waveform or digital signals.

Figure 9:
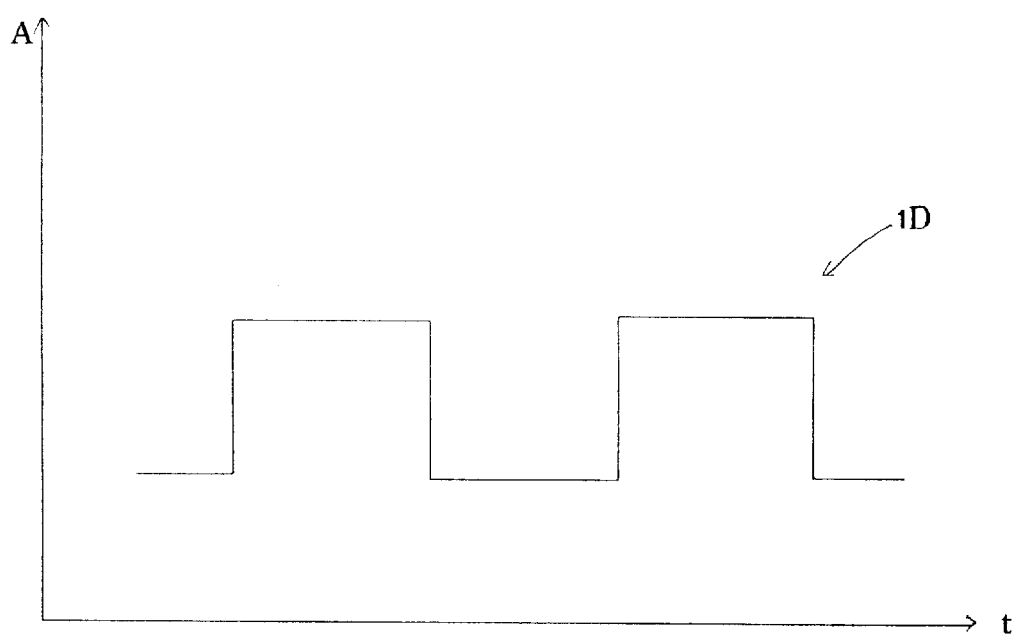
FIG. 9 is a waveform chart of the digitized wobble components.

In the disk drive unit of the present embodiment, the digital waveform ID shown in FIG. 9 is treated as the wobble components 1.

In the present embodiment, the output signals of the photo diodes 14a and 14b are differential-amplified by the differential amplifier 34 so as to sample the wobble components 1. Then, the wobble components 1 are filtered by the low pass filter 26. A band pass filter may be provided between the differential amplifier 34 and the low pass filter 26 so as to filter and shape the wobble components 1. By employing the band pass filter, a more preferable waveform of the wobble components can be produced.

In the disk drive unit, the low power laser beams 20 for reading data and the high power laser beams 22 for writing data are received by two photo diodes 14a and 14b throughout the wobble groove 16. Then, the output signals of the photo diodes 14a and 14b, which correspond to the luminous power of the reflected laser beams, are differential-amplified and filtered, so that the wobble components 1 can be sampled without using the sample/hold circuit.

Since the wobble components 1 are sampled by the two photo diodes 14a and 14b, the conventional technology can be applied, so that manufacturing cost of the disk drive unit can be reduced. Further, high speed data writing can be realized due to no sample/hold circuit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A disk drive unit, in which wobble components are sampled from laser beams reflected from an optical disk so as to write data on the optical disk, comprising:
   a first photo diode or detecting one longitudinal edge of a wobble groove of the optical disk;
   a second photo diode for detecting the other longitudinal edge of the wobble groove;
   a differential amplifier to which signals are sent from said first and second photo diodes receiving the reflected laser beams, said differential amplifier shaping a flexure caused by a difference of luminous power between low power laser beams of the reflected laser beams, which are used for reading data, and high power laser beams thereof, which are used for writing data, and sampling the wobble components only;
   a noise removing circuit for removing noise from the wobble components sampled by said differential amplifier; and
   a comparator digitizing the wobble components from which the noise has been removed by said noise removing circuit.

* * * * *